(12) United States Patent
Ozagir et al.

(10) Patent No.: US 11,337,521 B2
(45) Date of Patent: May 24, 2022

(54) HYDRAULIC SUPPORT

(71) Applicant: Flat Pty Ltd, Glebe (AU)

(72) Inventors: Ozcan Ozagir, Glebe (AU); Lawrence Brown, Glebe (AU); Manuel Subias Figueroa, Glebe (AU)

(73) Assignee: Flat Pty Ltd, New South Wales (AU)

( * ) Notice: Subject to any disclaimer, the term of this patent is extended or adjusted under 35 U.S.C. 154(b) by 0 days.

(21) Appl. No.: 16/690,165

(22) Filed: Nov. 21, 2019

(65) Prior Publication Data
US 2020/0146449 A1    May 14, 2020

Related U.S. Application Data

(63) Continuation of application No. 16/060,676, filed as application No. PCT/AU2016/051242 on Dec. 16, 2016, now Pat. No. 10,555,608.

(51) Int. Cl.
| | |
|---|---|
| *F16M 11/00* | (2006.01) |
| *A47B 91/16* | (2006.01) |
| *A47B 91/02* | (2006.01) |
| *E06C 7/44* | (2006.01) |
| *F16M 11/24* | (2006.01) |

(52) U.S. Cl.
CPC ............. *A47B 91/16* (2013.01); *A47B 91/02* (2013.01); *E06C 7/44* (2013.01); *F16M 11/242* (2013.01); *F16M 2200/044* (2013.01); *F16M 2200/08* (2013.01)

(58) Field of Classification Search
None
See application file for complete search history.

(56) References Cited

U.S. PATENT DOCUMENTS

| 2,042,443 | A | | 5/1936 | Buckstone | |
|---|---|---|---|---|---|
| 2,635,838 | A | * | 4/1953 | Branson | F16F 15/023 248/562 |
| 3,191,895 | A | | 6/1965 | Whelan | |
| 3,388,883 | A | | 6/1968 | Axthammer et al. | |
| 4,473,214 | A | | 9/1984 | Sterner et al. | |
| 4,625,424 | A | * | 12/1986 | de la Haye | G12B 5/00 248/649 |
| 4,653,381 | A | | 3/1987 | van Os | |
| 4,993,522 | A | | 2/1991 | Wagner | |

(Continued)

FOREIGN PATENT DOCUMENTS

| DE | 19532863 | 3/1996 |
|---|---|---|
| NL | 1024879 | 5/2005 |

OTHER PUBLICATIONS

EP application 16874143.7—Extended European Search Report, dated Sep. 3, 2019. 8 pages.

(Continued)

*Primary Examiner* — Steven M Marsh
(74) *Attorney, Agent, or Firm* — Joseph E. Maenner; Maenner & Associates, LLC

(57) ABSTRACT

A hydraulic foot assembly for supporting an object on a surface, the foot assembly comprising a cylinder defining an interior reservoir, a piston dividing the reservoir into two chambers in fluid communication with one another, the piston moveable within the reservoir, the position of the piston within the reservoir effecting the overall length of the foot assembly, a valve arrangement configured to limit movement of the piston within the reservoir.

6 Claims, 18 Drawing Sheets

(56) References Cited

U.S. PATENT DOCUMENTS

| | | | |
|---|---|---|---|
| 5,915,674 A | 6/1999 | Wolf et al. | |
| 6,736,380 B2 | 5/2004 | Knapp | |
| 10,605,324 B2* | 3/2020 | Zhao | D06F 39/125 |
| 10,704,179 B2* | 7/2020 | Zhao | F16F 9/3415 |
| 10,711,388 B2* | 7/2020 | Zhao | D06F 37/20 |
| 2006/0021391 A1* | 2/2006 | Yim | D06F 39/12 |
| | | | 68/3 R |
| 2006/0180720 A1* | 8/2006 | Coumoyer | A47B 91/02 |
| | | | 248/188.2 |
| 2007/0023590 A1 | 2/2007 | Lotz | |
| 2010/0237205 A1 | 9/2010 | Hirsh | |
| 2013/0313385 A1* | 11/2013 | Mora | F16M 7/00 |
| | | | 248/188.4 |
| 2018/0328438 A1* | 11/2018 | Zhao | F16F 9/3405 |

OTHER PUBLICATIONS

International Search REport for PCT/AU2016/051242, dated Mar. 6, 2017. 3 pages.

* cited by examiner

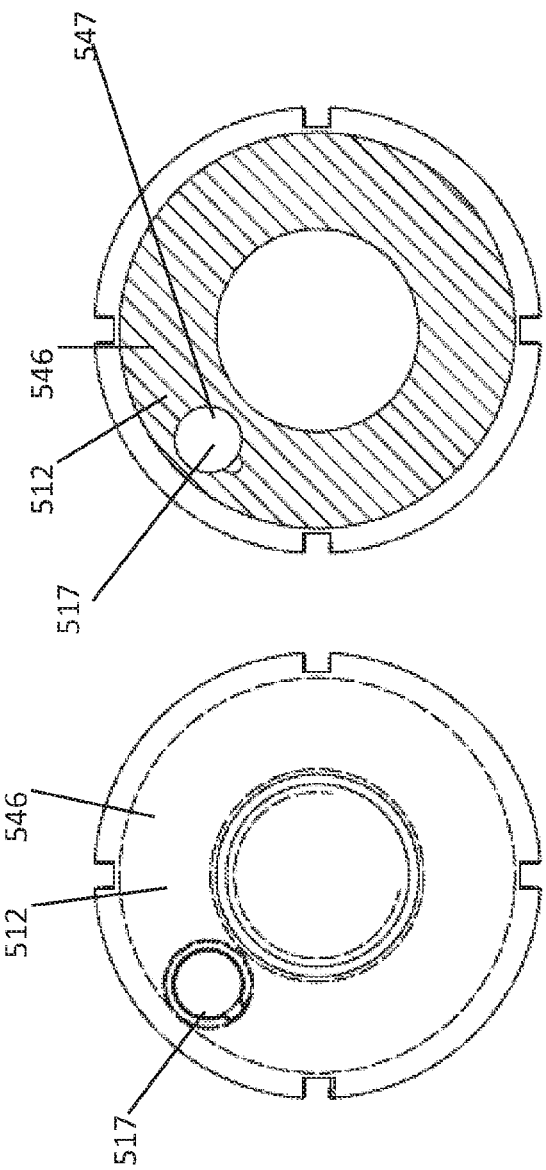

HYDRAULIC SUPPORT

TECHNICAL FIELD

This disclosure relates to an assembly for supporting an object on a surface. The disclosure is particularly directed toward a hydraulic foot assembly for supporting and stabilising an object on a surface.

BACKGROUND ART

Structures such as tables, ladders and tripods have legs or feet for positioning on a surface. If not all of the feet contact the surface, the position of the structure will be unstable. The position of the structure can be made more stable by adjusting the heights of individual legs or feet. This is often done with a screw-type mechanism commonly found at the bottom of the legs.

Alternatively, all of the legs may be in contact with the surface but the structure may not have a desired orientation relative to the surface. Again, the position of the structure relative to the surface may be adjusted by adjusting the height of the individual legs with the same type of screw mechanism. Other structures such as large machines and houses may contact the ground directly without legs or through supporting beams or a base plate. Level or tilt adjustment of these large structures typically is done with individually controlled jacks or wedges.

In any case the adjustment of the position of the structure typically is cumbersome and time consuming There is a need for a technically advanced solution.

Pistons have been utilised to stabilise structures such as ladders, tripods and tables. Generally one piston is associated with each leg of the structure. The pistons are in fluid communication. Thus the pistons can be utilised to together adjust the position of individual support legs. When the position of the structure is considered stable the pistons are manually isolated so no further adjustment occurs. These systems do not provide self-adjusting support.

Moreover, the systems do not provide a retrofittable solution or an autonomous solution that can be positioned on pre-existing table bases and is easy to adjust.

SUMMARY

Disclosed in some forms is a hydraulic foot assembly for supporting an object on a surface, the foot assembly comprising a cylinder defining an interior reservoir, a piston dividing the reservoir into two chambers in fluid communication with one another, the piston moveable within the reservoir, the position of the piston within the reservoir effecting the overall length of the foot assembly, a valve arrangement configured to limit movement of the piston within the reservoir.

In some forms the valve arrangement is configured to allow movement in response to pressure in a particular direction within the system. For example, in some forms fluid pressure above a predetermined minimum in a downward direction acts to allow movement of the piston upwardly within the assembly. Similarly fluid pressure above a predetermined minimum in an upward direction within the assembly allows movement of the piston downwardly within the assembly. In some forms the fluid pressure results from external pressure on the table. In some forms the fluid pressure results from internal biasing forces.

In some forms the valve arrangement comprises a first valve in the form of a unidirectional fluid control valve, the first valve configured to allow fluid flow from the first chamber to the second chamber when the fluid pressure from the first chamber to the second chamber is greater than a first predetermined minimum and to resist fluid flow from the first chamber to the second chamber when the fluid pressure is lower than the first predetermined minimum and a second valve in the form of a unidirectional fluid control valve allowing fluid flow from the second chamber to the first chamber when the fluid pressure from the second chamber to the first chamber is greater than a second predetermined minimum and resisting fluid flow from the second chamber to the first chamber when the pressure is lower than the second predetermined minimum. In some forms the first predetermined minimum is lower than the second predetermined minimum.

In some forms movement of fluid from the first into the second chamber is effective to lengthen the support. In some forms movement of fluid from the second into the first chamber is effective to shorten the support. In some forms a biasing member is included to bias the piston into upward motion and the fluid into downward movement. In some forms the object is supported on the piston which acts as a weight bias, biasing the piston into downward motion and the fluid in the assembly into upward movement.

When set up in a support, in some embodiments the valve arrangement allows fluid flow to lengthen the support when the support is not in contact with the floor or other surface as the weight bias of the object is no longer in play and the greatest force acting on the piston is the upward bias of the biasing member. This force provides sufficient fluid pressure to actuate fluid flow from the first chamber into the second chamber allowing movement of the piston which lengthens the support. When the support is in contact with the floor and the weight of the object is resting on the piston, the fluid pressure on both valves is insufficient to actuate fluid flow between the chambers and the piston is at rest. When a force is effected on the object that force is applied to the piston placing fluid pressure on the second valve. When that force exceeds the force of the biasing member sufficiently that the second predetermined minimum pressure is reached, that is the upward fluid pressure, fluid flow from the second chamber into the first is actuated, allowing movement of the piston to shorten the support.

In some forms the assembly further comprises a support member extending from the piston through a wall of the cylinder, the support member being configured such that movement of the piston within the interior reservoir effects movement of the support member with respect to the wall of the cylinder, changing the overall length of the foot assembly. In some forms the assembly or the support is shortened by movement of a shaft attached with the piston and extending through the assembly, the movement resulting in it extending further into the cylinder in response to downward movement of the piston with respect to the cylinder. In some forms the assembly is lengthened by the shaft protruding further from the cylinder in response to upward movement of the piston.

In some forms the valve arrangement comprises elastomeric valves.

Further, disclosed is a foot assembly for supporting an object on a surface, the foot assembly comprising a foot body defining an interior reservoir, a piston moveable within the interior reservoir and dividing the interior reservoir into two chambers, the chambers being in fluid communication with one another, movement of the piston effecting a change in the relative capacity of the chambers, a valve for interrupting flow of fluid between the chambers. In some forms the valve comprises a single valve including a valve stop element configured to adopt a valve stop configuration that prevents the valve from interrupting the flow of fluid between the chambers.

In some forms the valve arrangement is configured to allow fluid flow from the first chamber to the second chamber when piston is in a particular position or configuration and to resist fluid flow from the first chamber to the second chamber when the piston is in an alternative position or configuration.

BRIEF DESCRIPTION OF THE DRAWINGS

Specific embodiments will now be described, by way of example only, with reference to the accompanying drawings in which:

FIG. 18 is a lateral cross sectional view of the piston of FIG. 17;

FIG. 19 is a lateral cross sectional view of the piston of FIG. 17;

DETAILED DESCRIPTION

Figure 1:
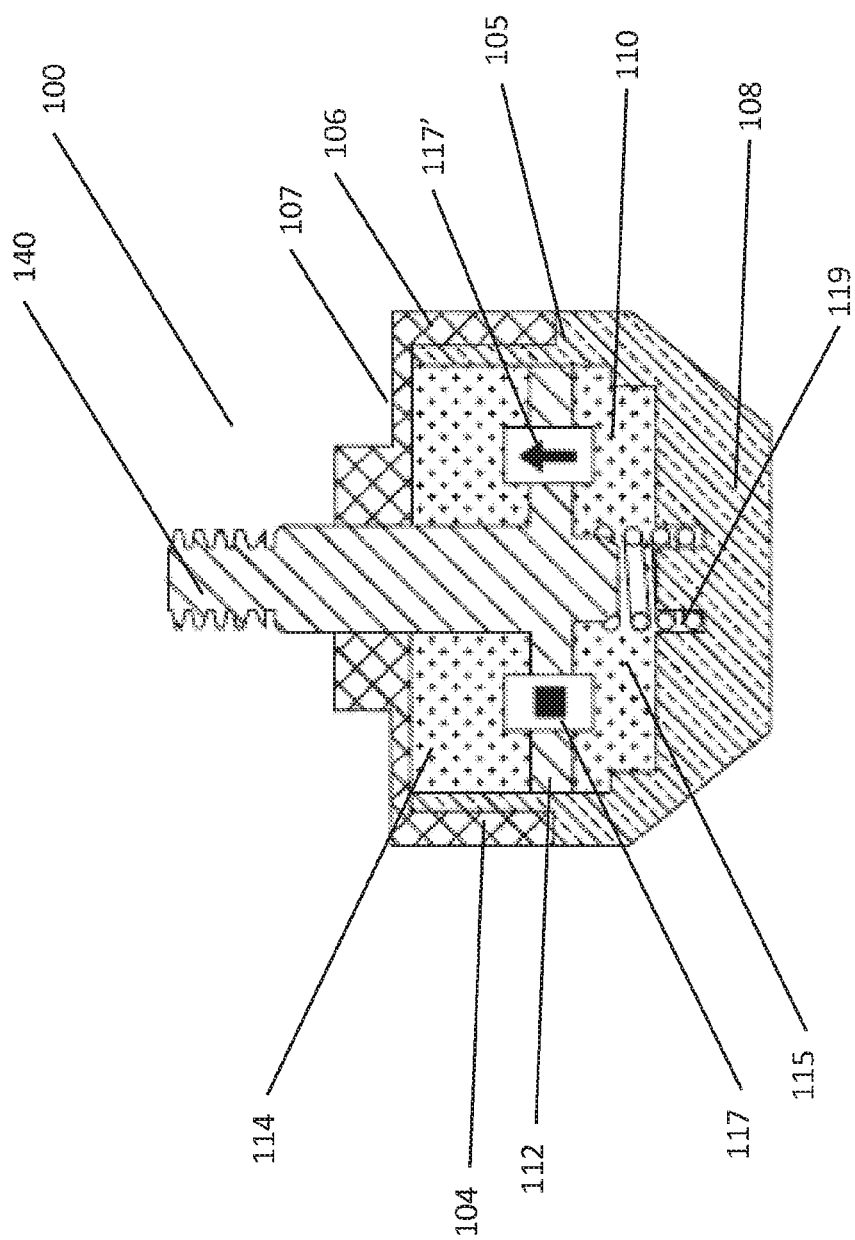
FIG. 1 is a diagrammatic representation showing a cross section of an assembly of one embodiment of the disclosure in a first position.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Disclosed herein is a hydraulic foot assembly for supporting an object on a surface, the foot assembly comprising: a cylinder defining an interior reservoir, a piston dividing the reservoir into a first chamber and a second chamber, the chambers being in fluid communication with one another, the piston moveable within the reservoir, the position of the piston within the reservoir effecting the overall length of the foot assembly, a valve arrangement configured to control movement of fluid between the chambers and thereby control movement of the piston within the cylinder.

In some forms, the support member is configured such that movement of the piston within the interior reservoir effects movement of the support member with respect to the wall of the cylinder, changing the overall length of the foot assembly.

In some forms, the valve arrangement is configured to allow fluid flow from the first chamber to the second chamber when the fluid pressure is greater than a first predetermined minimum in the direction from the first chamber to the second chamber and to resist fluid flow from the first chamber to the second chamber when the fluid pressure is lower than the first predetermined minimum in the direction from the first chamber to the second chamber, and to allow fluid flow from the second chamber to the first chamber when the pressure is greater than a second predetermined minimum in the direction from the second chamber to the first chamber and to resist fluid flow from the second chamber to the first chamber when the pressure is lower than the second predetermined minimum in the direction from the second chamber to the first chamber.

In some forms the first predetermined minimum is lower than the second predetermined minimum.

In some forms movement of fluid from the first into the second chamber is effective to lengthen the support and movement of fluid from the second into the first chamber is effective to shorten the support.

In some forms the valve arrangement comprises at least two unidirectional fluid control valves.

In some forms the assembly further comprises a biasing member to bias the piston into motion to reduce the capacity of the first chamber.

In some forms the object rests on the piston, and the weight of the object biases the piston to reduce the capacity of the second chamber.

In some forms the valves are elastomeric.

In use, a plurality of foot assemblies may be attached with the base of an object for supporting the object on a surface. If the surface is uneven, not all of the foot assemblies may reach the surface or alternatively the object may be at an angle that is not desired. Foot assemblies that are not under pressure from the surface, will extend, changing the overall length of the foot assembly. This allows for stabilisation of the object.

Further, disclosed is a foot assembly for supporting an object on a surface, the foot assembly comprising: a foot body defining an interior reservoir, the interior reservoir extending between a surface end and an object end; a piston moveable within the interior reservoir and dividing the interior reservoir into a first chamber and a second chamber, the chambers being in fluid communication with one another, movement of the piston effecting a change in the relative capacity of the chambers; a valve arrangement for interrupting flow of fluid between the chambers; a support member extending from the piston through a wall of the foot body, the support member being configured such that movement of the piston within the interior reservoir effects movement of the support member with respect to the wall of the foot body to move the support member between an extended position and a contracted position, wherein in the extended position a greater length of support member extends beyond the foot body and in the contracted position a greater length of support member is positioned within the interior reservoir.

In some forms the valve arrangement restricts fluid movement in a first direction when the fluid pressure in the assembly is lower than a predetermined minimum in that direction and restricts movement in a second direction when the fluid pressure in the assembly is lower than a predetermined minimum in that direction.

In some forms the valve assembly comprises at least two unidirectional valves, the unidirectional valves being configured to allow flow in opposing directions from one another.

In these forms movement of fluid within the assembly and therefore movement of the piston with respect to the cylinder is effected by pressure within the system.

The assembly is configured such that when the assembly is raised from the ground and not in contact with the ground, the pressure on the fluid is a result of the biasing member biasing the piston into motion to extend the assembly. When the assembly is resting on the ground the pressure on the fluid is at balance between the biasing member and the weight of the object the assembly is supporting. When external pressure is placed on the object by, for example, pressing down on the object at a location that effects pressure on the assembly, the pressure on the fluid is a result of that external pressure and results in shortening of the assembly.

In some forms the foot assembly comprises a foot body defining an interior reservoir, the interior reservoir extending between a surface end and an object end; a piston moveable within the interior reservoir and dividing the interior reservoir into two chambers, the chambers being in fluid communication with one another, movement of the piston effecting a change in the relative capacity of the chambers; a valve for interrupting flow of fluid between the chambers; a valve stop element configured to adopt a valve stop configuration that prevents the valve from interrupting the flow of fluid between the chambers; and a support member extending from the piston through a wall of the foot body, the support member being configured such that movement of the piston within the interior reservoir effects movement of the support member with respect to the wall of the foot body to move the support member between an extended position and a contracted position, wherein in the extended position a greater length of support member extends beyond the foot body and in the contracted position a greater length of support member is positioned within the interior reservoir.

In some forms at least one fluid channel extends through the piston to allow fluid communication between the chambers.

In some forms the valve is located in at least one fluid channel within the piston.

In some forms the valve is a ball valve moveable between an open position and a closed position.

In some forms the valve stop element is configured to adopt a valve stop configuration when the piston moves into a particular position within the interior reservoir.

In some forms the valve stop element includes a protrusion which, when the valve stop element is in the valve stop configuration, is positioned to prevent the ball valve from moving into a closed position.

In some forms the valve stop element is moveable with respect to the piston, between the valve stop configuration in which the valve is prevented from moving into a closed position and an open configuration in which the valve can move into a closed position.

Figure 2:
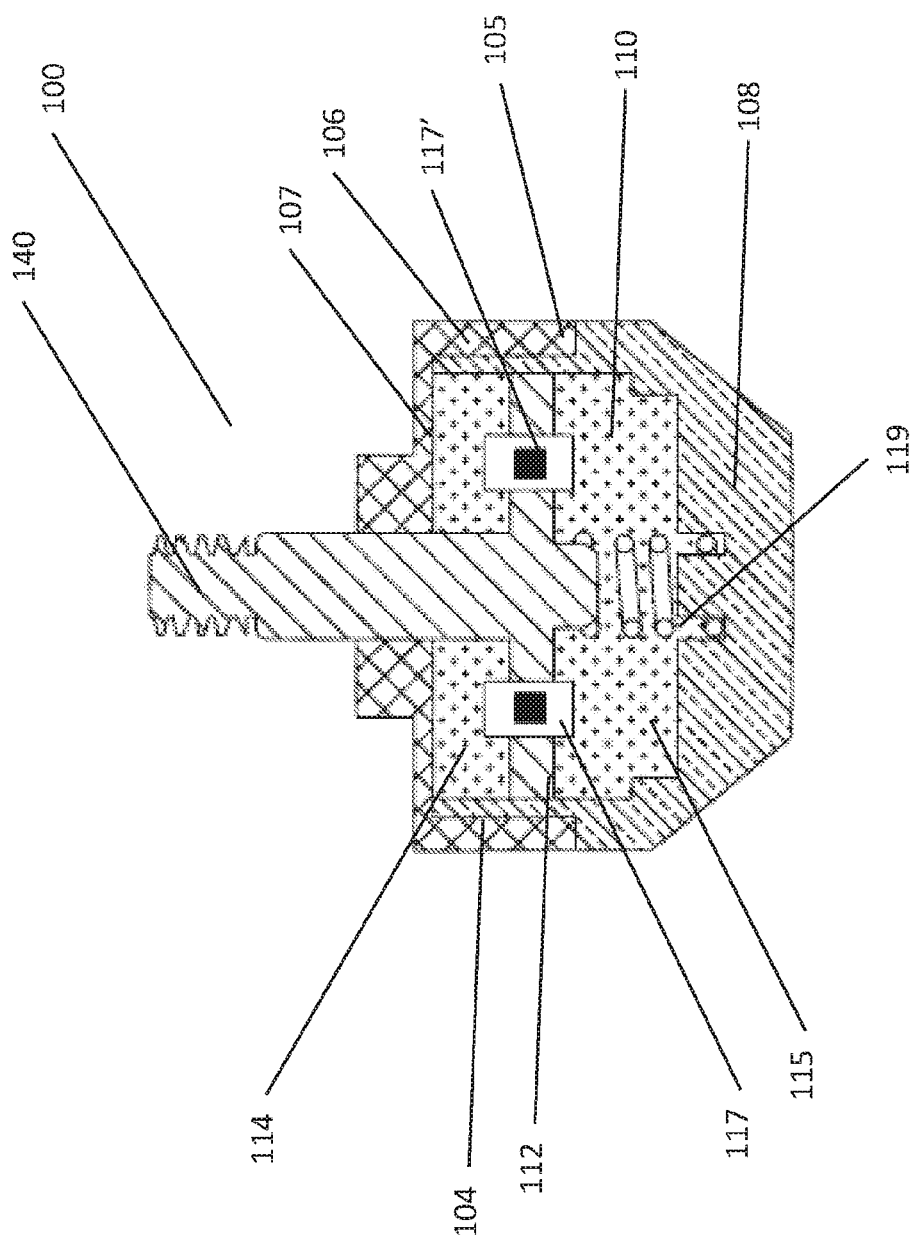
FIG. 2 is a diagrammatic representation of the assembly of FIG. 1 in a second position.
Figure 3:
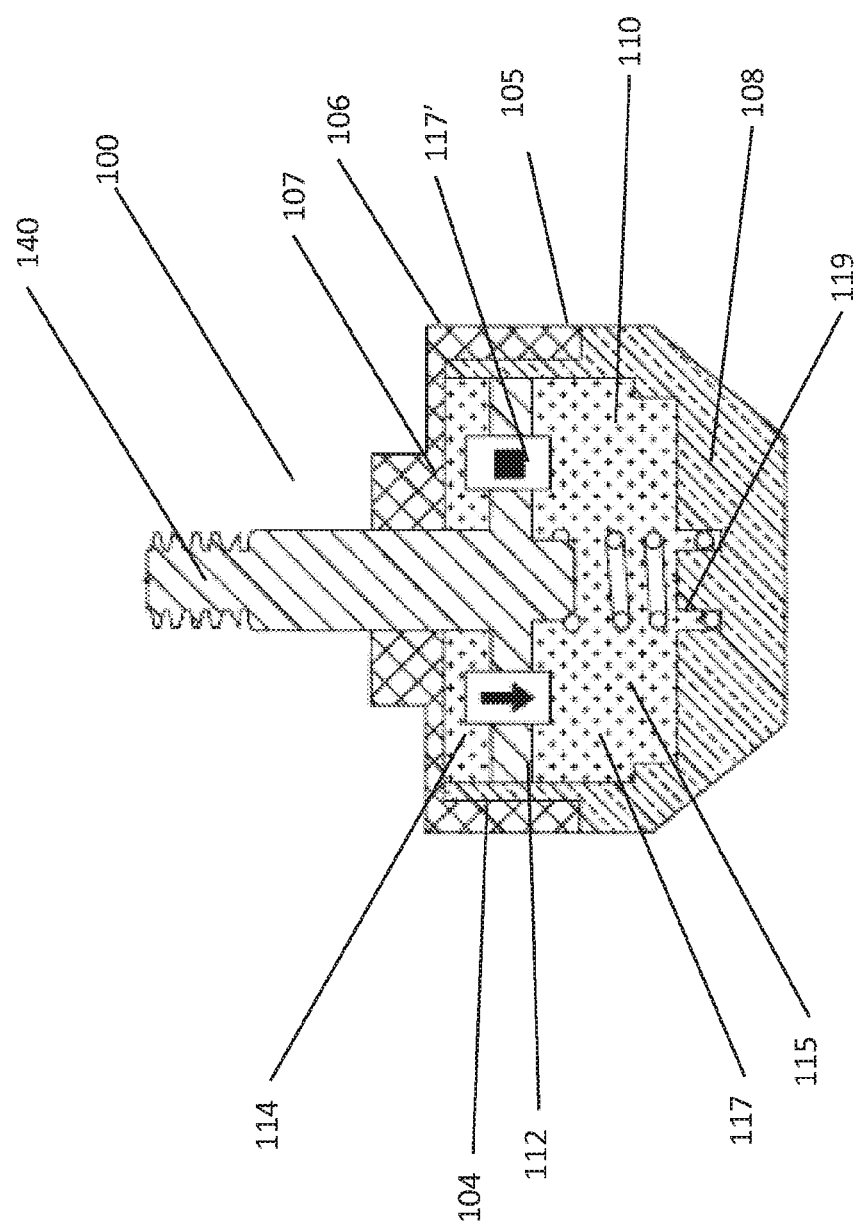
FIG. 3 is a diagrammatic representation of the assembly of FIG. 1 in a third position.

Referring now to the figures, FIGS. 1-3 show a cross-sectional view in diagrammatic form of a foot assembly 100 for supporting an object (not illustrated) above a surface. The foot assembly 100 comprises a foot body 104 in the form of a cylinder 105 defined by walls 106, an upper wall 107 at the object end and a base 108 at the surface end of the foot body 104. The foot body 104 defines an interior reservoir 110. The interior reservoir is configured to contain fluid such as hydraulic fluid or oil or any alternative fluids.

A piston 112 is located within the interior reservoir 110 of the foot body 104 and divides the interior reservoir 110 into an upper chamber 114 located proximal the object end of the foot body 104 and a lower chamber 115 located proximal the surface end of the foot body 104. The upper chamber 114 and lower chamber 115 are in fluid communication. In the illustrated form the chambers are in fluid communication through two channels 117 and 117' extending through the piston 112.

Movement of the piston 112 within the interior reservoir 110 effects movement of fluid between the upper and lower chambers as it effects a change in the relative capacity of the upper chamber 114 and the lower chamber 115. The fluid moves between the chambers through the channels.

A valve arrangement is located in the channels 117 and 117'. The valve arrangement comprises, in the illustrated form, two unidirectional valves, one of which is located in channel 117 and allows fluid movement from the first chamber 114 into the second chamber 115 and one of which is located in channel 117' and allows fluid movement from the second chamber into the first. The unidirectional valves are designed to resist movement of fluid therethrough when the fluid pressure moving in that direction is less than a predetermined minimum.

The piston is biased upwardly by a biasing member 119. In the illustrated form the biasing member is in the form of a spring positioned to bias the piston upward. The piston is biased downwardly by the weight of the table. Thus for movement of the piston downwardly within the cylinder, the downward pressure on the object must be greater than the minimum pressure required for movement of fluid through a valve allowing fluid flow from the second chamber 115 to the first chamber 114. In some forms this level of pressure requires external force placed on the object.

For movement of the piston upwardly, the upward biasing pressure of the biasing member 119 must be sufficient to allow flow from the first chamber 114 to the second chamber 115. In some forms for the upward biasing pressure to be sufficient the area of the object being supported must be lifted above the surface so that the major biasing force comes from the biasing member 119.

In FIG. 1, the foot assembly is shown in the top position. In this position the channel 117' is open to allow fluid flow from lower chamber 115 to upper chamber 114. The foot assembly 100 can be compressed by pressure downwardly on the support member 140 that is greater than the upward pressure of the biasing member 119.

In FIG. 2, the upward force of the biasing member 119 and the weight of the table are in equilibrium and the piston is held in position. Thus both channels are closed.

In FIG. 3, channel 117 is open as the pressure in the system is provided by the upward biasing force of the biasing member 119. Thus the pressure is sufficient to open the valve in channel 117 to allow flow from the upper chamber 114 into the lower.

Figure 4:
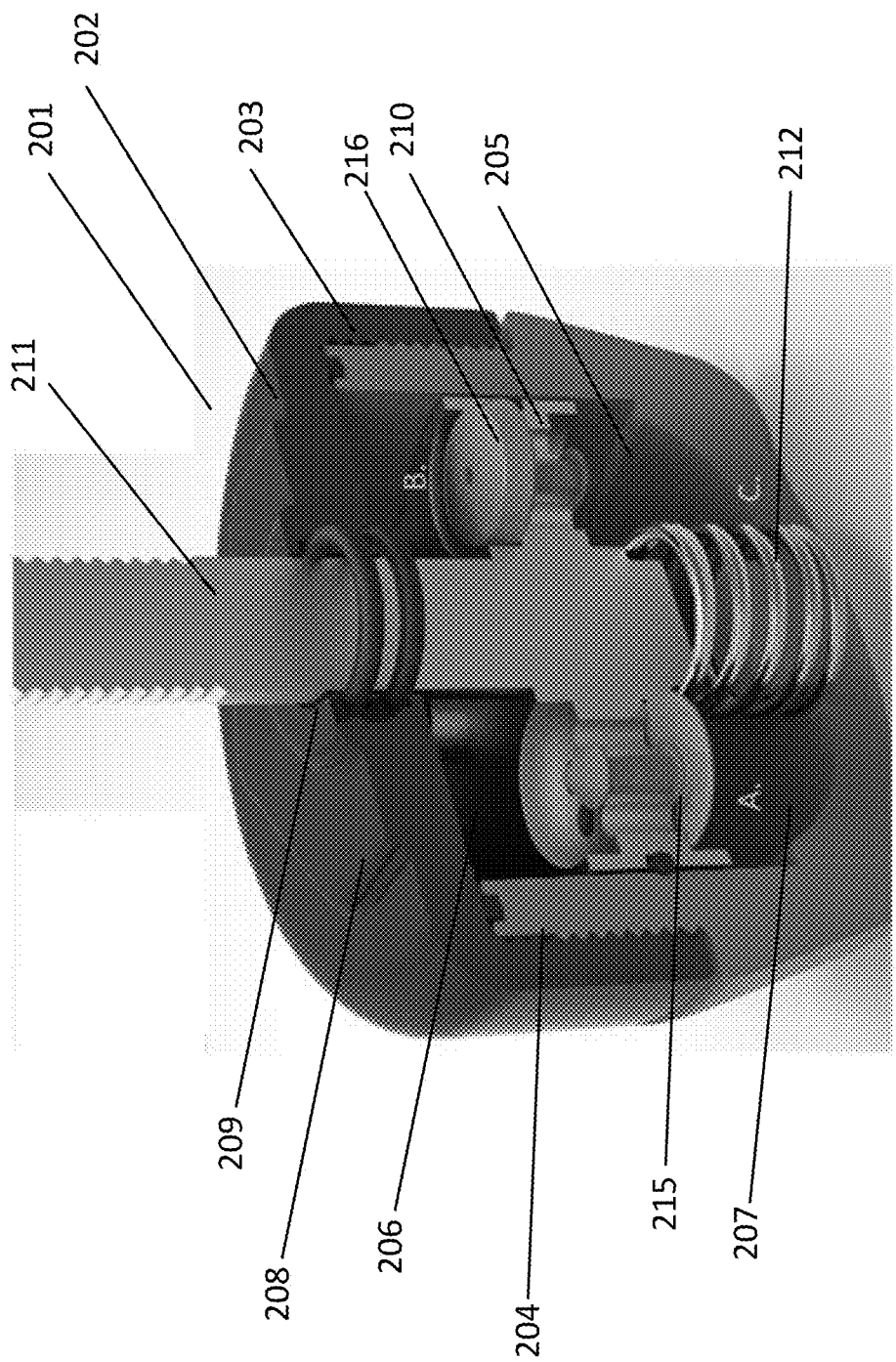
FIG. 4 is a perspective cutaway view of a further embodiment of the disclosure.
Figure 5:
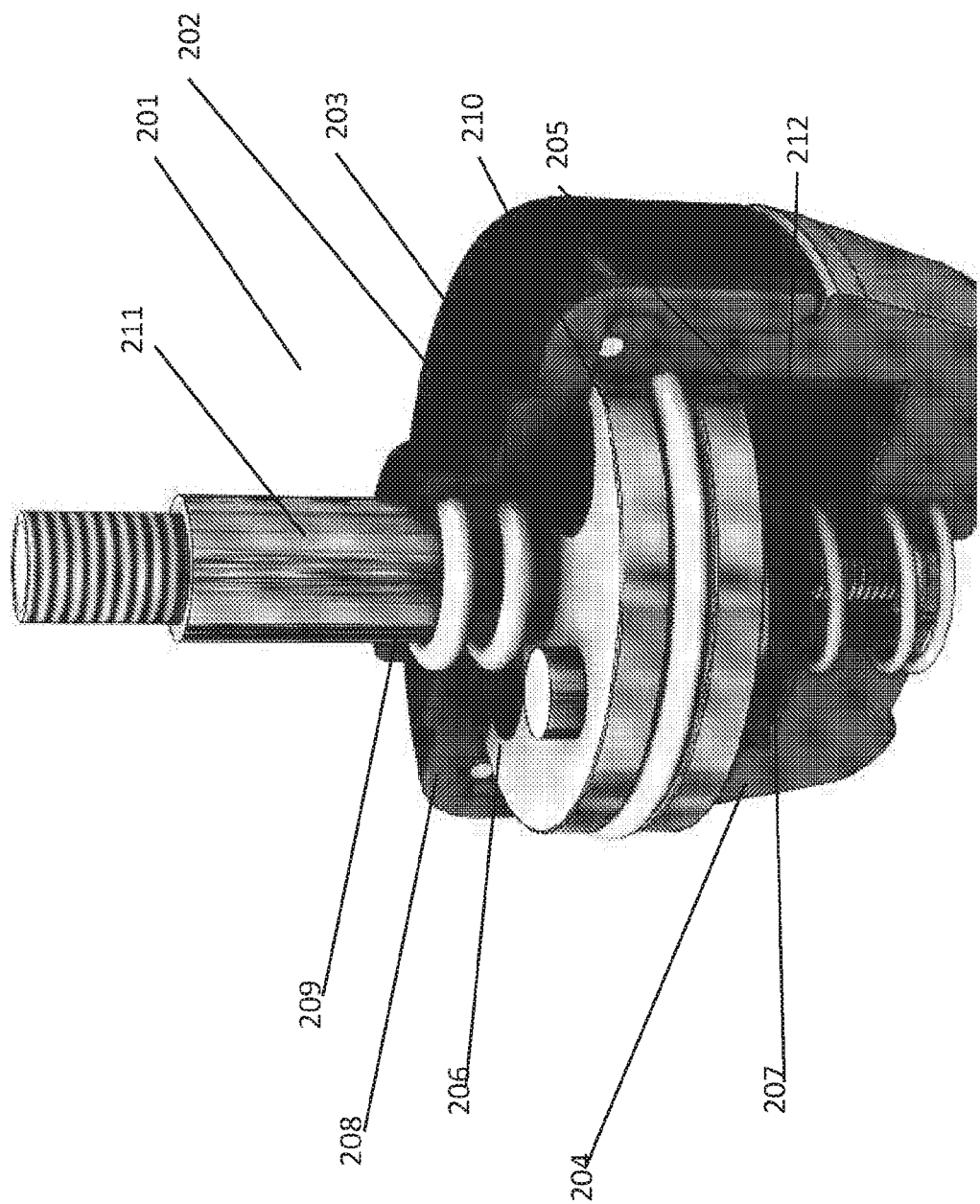
FIG. 5 is a perspective cutaway view of the embodiment of FIG. 4.

Referring now to FIGS. 4 and 5, in a further embodiment, disclosed is a support 201 comprising a support body 202 in the form of a cylinder 203. The cylinder 203 is composed of walls 204 defining an interior cavity 205. The interior cavity 205 is divided into a first upper chamber 206 and a second lower chamber 207. In the illustrated embodiment the first upper chamber is located closest to the object the support is supporting while the second lower chamber is located closer to the surface on which the object is being supported.

A piston 210 acts to divide the first chamber 206 from the second chamber 207. The piston 210 is moveable within the cylinder 203. An object engagement in the form of a shaft 211 extends from the piston through an opening 209 in an upper wall 208 of the cylinder 203. The shaft 211 moves with the piston 210 such that upward movement of the piston 210 extends the shaft further from the cylinder 203 to lengthen the overal support 201 while downward movement of the piston 210 with respect to the cylinder 203 draws the shaft 211 into the cylinder and shortens the overall length of the support 201. The piston is upwardly biased by a biasing member. In the illustrated form the biasing member is in the form of a spring 212, however alternative biasing members are possible.

The interior cavity 205 contains a fluid such as a hydraulic fluid. Movement of the piston 210 within the cylinder 203 is effected by movement of the fluid.

The support 201 further includes a valve arrangement comprising, in the illustrated form, two one-way valves. A lengthening first valve 215 is positioned within the piston and allows fluid flow from the first upper chamber 206 to the second lower chamber 207. The first valve allows fluid to flow through the valve when the fluid pressure is at a predetermined minimum. In some forms the predetermined minimum corresponds with the biasing pressure of the biasing member 212 or is predetermined such that the biasing pressure of the biasing member exerts sufficient pressure on the first valve to allow upward movement of the piston and extension of the assembly in response to the biasing member. In some cases the pressure is approximately 1-5 kg, in some cases the pressure is approximately 2-3 kg.

A shortening second valve 216 is located in the piston 210 and allows fluid flow from the second lower chamber 207 into the first upper chamber 206. The second valve 216 allows fluid flow only when the fluid pressure is at a predetermined minimum that is higher than the predetermined minimum required for flow through the first valve. The second valve 216 allows fluid flow at a fluid pressure that is greater than the fluid pressure of the simple weight of the object. Therefore if a force is placed on the object and translated to the piston, that force must be sufficient to overcome the resistance of the valve. In the illustrated form the second valve allows fluid flow at a fluid pressure of approximately 10-15 kg or in some forms approximately 12-14 kg.

Figure 6:
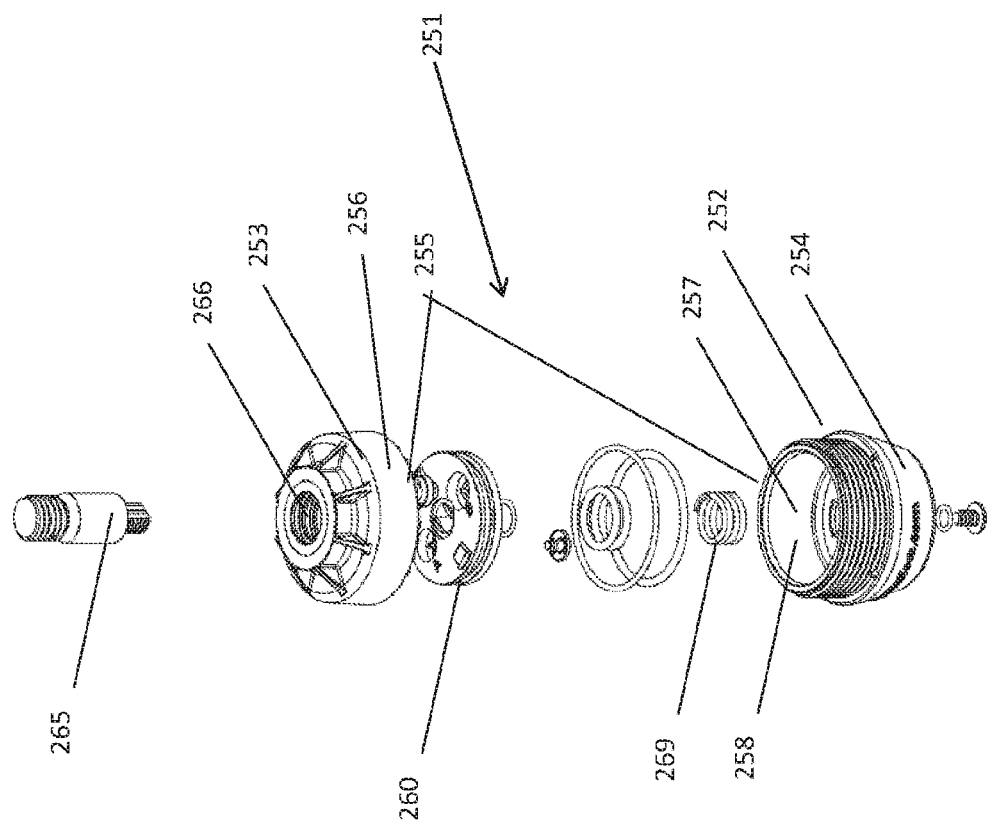
FIG. 6 is an exploded perspective view of a foot assembly of a further embodiment of the disclosure.

Referring to FIG. 6, in a further embodiment, disclosed is a support 251 comprising a support body 252 having upper body portion 253 and lower body portion 254 that connect to form a cylinder 255. The cylinder 255 is composed of walls 256 defining an interior cavity 257. The interior cavity 257 is divided into a first upper chamber and a second lower chamber 258. In the illustrated embodiment the first upper chamber is located closest to the object the support is supporting while the second lower chamber is located closer to the surface on which the object is being supported.

A piston 260 acts to divide the first chamber from the second chamber. The piston 260 is moveable within the cylinder 253. An object engagement in the form of a shaft 265 extends from the piston through an opening 266 in an upper wall of the body 252. The shaft 265 moves with the piston and in response to movement of the piston 260 such that upward movement of the piston 260 extends the shaft further from the body 252 to lengthen the overal support 251 while downward movement of the piston 260 with respect to the body 252 draws the shaft 265 into the body 252 and shortens the overall length of the support 251. The piston is upwardly biased by a biasing member. In the illustrated form the biasing member is in the form of a spring 269, however alternative biasing members are possible.

The interior cavity contains a fluid such as a hydraulic fluid that is moveable between the upper and lower chambers by means of a valve. Movement of the piston 260 within the body 252 is effected by movement of the fluid.

The support 251 further includes a valve arrangement comprising, in the illustrated form, two one-way valves. The valves are located in the piston such that fluid can move through the piston under certain conditions. A lengthening first valve is positioned within the piston and allows fluid flow from the first upper chamber to the second lower chamber. The first valve allows fluid to flow through the valve when the fluid pressure is at a predetermined minimum. In some forms the predetermined minimum corresponds with the biasing pressure of the biasing member or is predetermined such that the biasing pressure of the biasing member exerts sufficient pressure on the first valve to allow upward movement of the piston and extension of the assembly in response to the biasing member. In some cases the pressure is approximately 1-5 kg, in some cases the pressure is approximately 2-3 kg.

A shortening second valve is located in the piston and allows fluid flow from the second lower chamber into the first upper chamber. The second valve allows fluid flow only when the fluid pressure is at a predetermined minimum that is higher than the predetermined minimum required for flow through the first valve. The second valve allows fluid flow at a fluid pressure that is greater than the fluid pressure of the simple weight of the object. Therefore if a force is placed on the object and translated to the piston, that force must be sufficient to overcome the resistance of the valve. In the illustrated form the second valve allows fluid flow at a fluid pressure of approximately 10-kg or in some forms approximately 12-14 kg.

It will be clear that the minimum pressure requirements are changed by the circumstances. If the support is supporting an object of greater weight the minimum pressure to allow fluid flow must be greater than the pressure produced by the weight of the object.

It will also be clear that alternative valve arrangements are possible to allow for the support to lengthen when a first pressure is on the support, to remain at a consistent length when a second pressure that is higher than the first pressure is on the support, and to shorten when a third pressure that is higher than the second pressure is on the support. In some forms this valve arrangement comprises a single bidirectional valve.

In use, when the object is raised so that the support 201 does not contact the ground, the pressure within the system is provided by the biasing force of the biasing member 212 on the piston 210. This pressure is sufficient to overcome the resistance of the first valve 215 and allow fluid flow from the first upper chamber 206 into the second lower chamber 207, moving the piston upwardly within the cylinder and effecting movement of the shaft 211 to extend further from the cylinder and lengthen the support 201.

When the object is resting on the surface, the forces are insufficient to allow fluid flow through either valve and the support is at rest.

When a force such as pushing down on the object is effected that is translated through the shaft 211 to the piston 210. That fluid pressure, if greater than the minimum required to allow fluid flow through the second valve, effects opening of the second valve allowing fluid flow from the lower second chamber 207 to the upper first chamber 206. This moves the piston downwardly, causing the shaft 211 to move into the cylinder and shorten the support 201.

Thus if an object has multiple feet, any feet resting on the surface will maintain their position and length, any feet not in contact with the surface will lengthen in response to the biasing action of the internal bias member, and any feet that are pressed onto the surface by external pressure will shorten. The external pressure must be positioned to translate into pressure on the assembly.

The first and second valves may be in the form of elastomeric valves or umbrella valves that seal in one direction and open in the other under particular fluid pressure requirements. In some forms the valves may comprise a single bidirectional valve.

Figure 7:
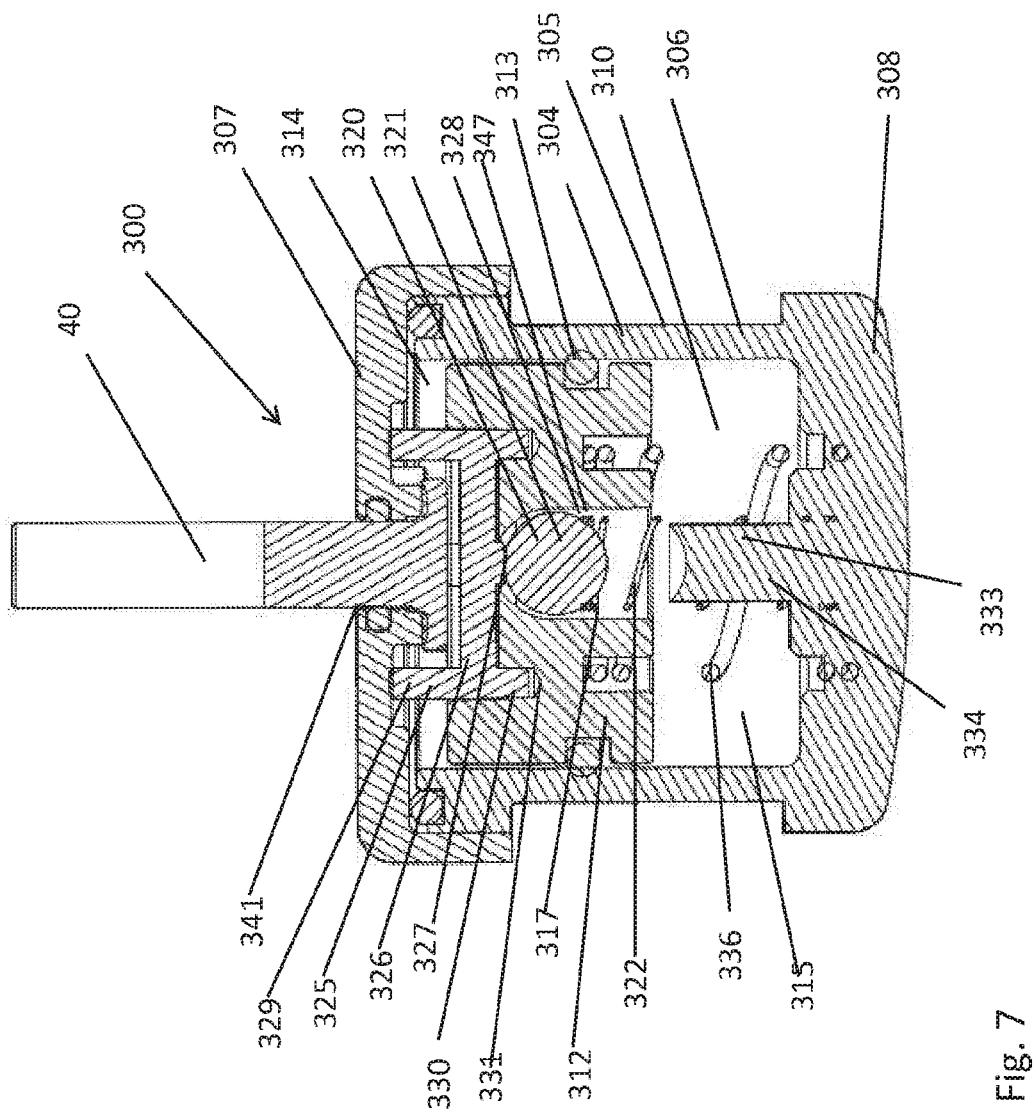
FIG. 7 is a cross sectional view of a device of a further embodiment of the disclosure.
Figure 8:
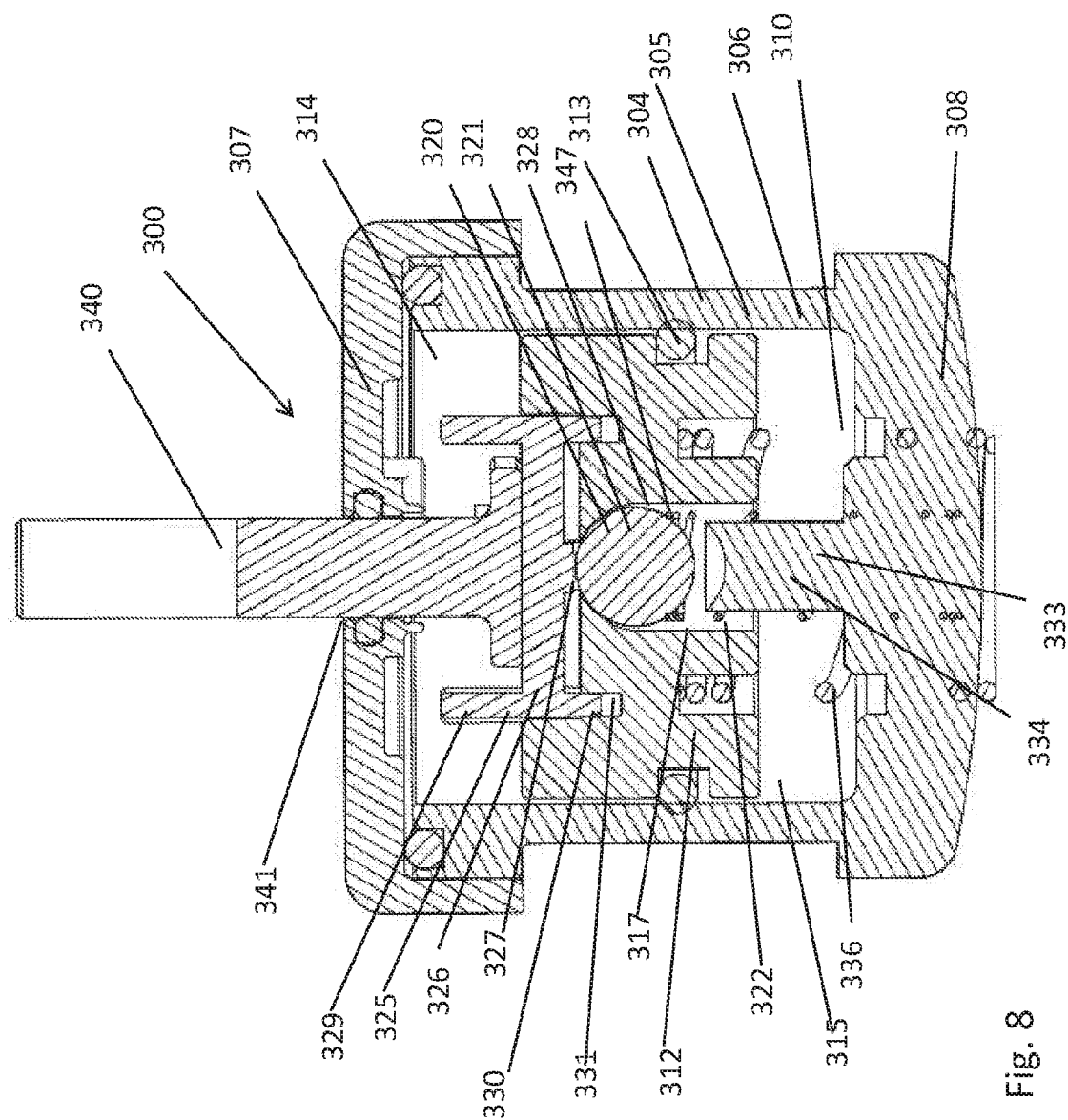
FIG. 8 is a cross sectional view of the device of FIG. 7 in a second configuration.
Figure 9:
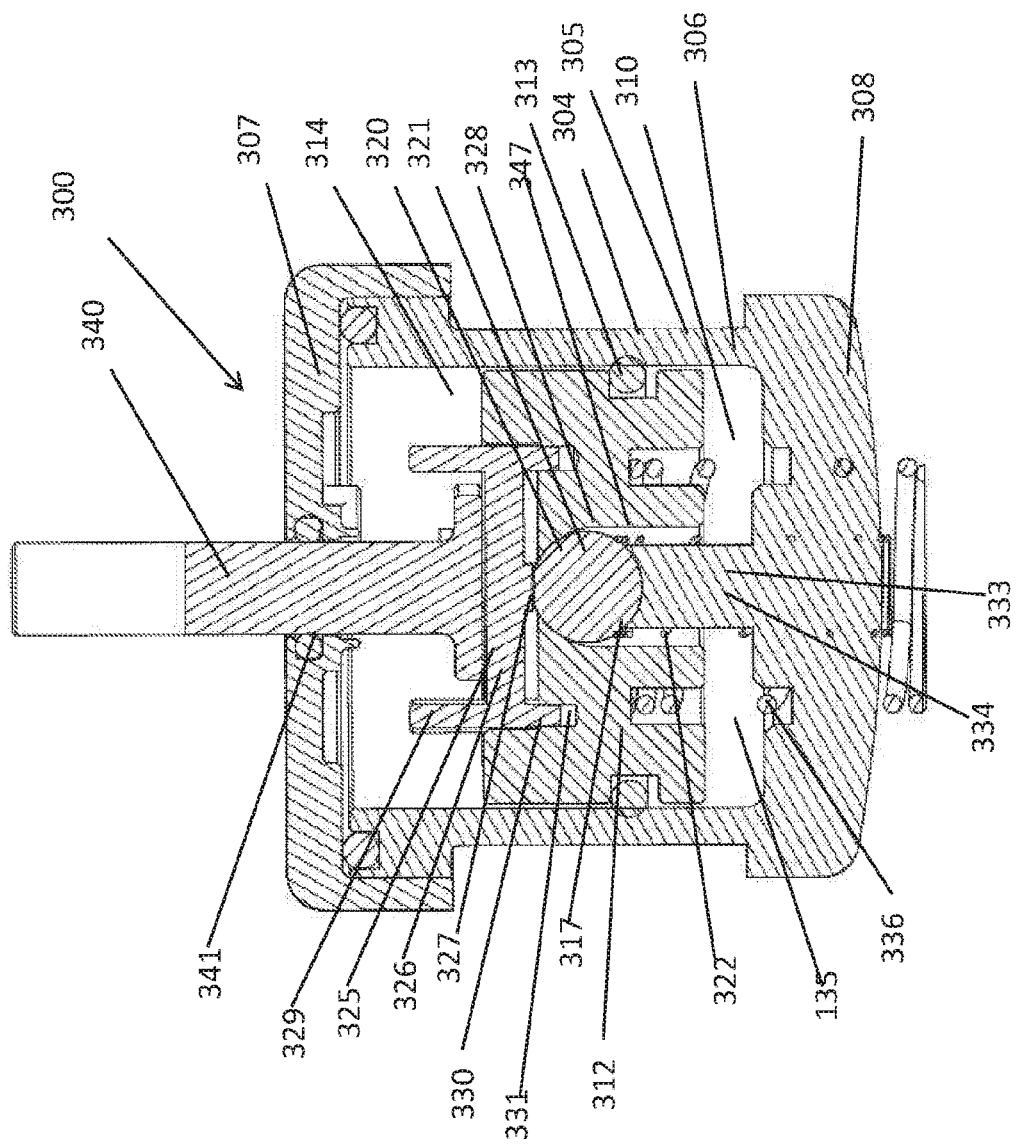
FIG. 9 is a cross sectional view of the device of FIG. 7 in a third configuration.

FIGS. 7-9 show a foot assembly 301 for supporting an object above a surface. The foot assembly 301 comprises a foot body 304 in the form of a cylinder 305 defined by walls 306, a cover 307 at the object end and a base 308 at the surface end of the foot body 304. The foot body 304 defines an interior reservoir 310. The interior reservoir is configured to contain fluid such as hydraulic fluid or oil or alternative fluids.

A piston 312 is located within the interior reservoir 310 of the foot body 304 and divides the interior reservoir 310 into an upper chamber 314 located proximal the object end of the foot body 304 and a lower chamber 315 located proximal the surface end of the foot body 304. An o-ring 313 positioned at the edge of the piston 312 prevents fluid flow around the piston. The upper chamber 314 and lower chamber 315 are in fluid communication through a channel 317 extending through the piston 312.

Movement of the piston 312 within the interior reservoir 310 effects movement of fluid between the upper and lower chambers as it effects a change in the relative capacity of the upper chamber 314 and the lower chamber 315. The fluid moves between the chambers through the channel 317.

A valve 320 is located in the channel 317. The valve 320 is in the form of a ball valve 321 biased upwardly into the piston 312 by a ball valve spring 322. The ball valve is moveable into a closed position in which it restricts the flow of fluid between the chambers.

The foot assembly 301 further includes a valve stop element 325 in the form of a wedge 326. The wedge 326 is shaped such that it interacts with the piston 312 and is moveable to block the movement of the ball valve 321 into the closed position.

As best shown in FIG. 7, the wedge 326 can be positioned such that it abuts the upper surface of the piston 312. In this position a protrusion 327 extending from the wedge extends into the channel to prevent the ball valve 321 from moving upwardly into the closed position. This allows a gap 328 around the ball which allows fluid flow both upward and downward from upper to lower chamber and from lower to upper chamber.

As shown in FIG. 8, the wedge 326 can also be positioned such that it is spaced apart from the piston 302. In this position the protrusion 327 is lifted out of the channel and no longer prevents the ball valve 321 from moving into the closed position. As shown in FIG. 8, in the closed position there is no gap around the ball valve and the ball valve restricts flow of fluid between the chambers.

Specifically in FIG. 8, fluid cannot flow upwardly from the lower chamber into the upper chamber. Restriction of flow of fluid between the chambers 314 and 315, restricts movement of the piston 312 within the interior reservoir 310 as fluid cannot move to allow movement of the piston 312.

Thus when fluid cannot move from the lower chamber 315 into the upper chamber 314, the piston 312 cannot move down toward the base 308.

The valve stop element 325 in the form of the wedge 326 is shaped and positioned to interact with but be independent from the piston 312. Specifically when the piston moves into its upper position, that is the piston 312 is positioned closest to the cover 307, upper flanges 329 of the wedge abut the cover 307 at the interior of the interior reservoir 310. The pressure of the wedge 326 against the cover forces lower flanges 330 of the wedge into depressions 331 in the piston 312. This allows the protrusion 327 to be positioned within the channel 317 to interrupt movement of the ball valve 321 to block the channel.

A valve release element 333 in the form of a shaft 334 extending from the base 308. As best shown in FIG. 9, when the piston 312 is in its lowest position, that is when the piston 312 is closest to the base 308, the shaft 334 abuts the ball valve. Pressure from the shaft 334 against the ball valve 321 dislodges the wedge 326 from the depressions 331 in the piston 312, releasing the ball valve and allowing it to act to prevent or restrict fluid movement.

A piston spring 336 biases the piston 312 upwardly to act against the downward pressure of the object and move the piston up when no pressure is placed on the table. In some forms the piston spring has an upward biasing force of between 1 and 5 kg.

A support member 340 in the form of a leg extending from the piston 312 and through an opening 341 in the cover 307 of the foot body 304, is engaged with the piston 312. Movement of the piston 312 within the interior reservoir 310 effects movement of the support member 340 in the form of a leg extending from the piston 312 and through an opening 41 in the cover 307 of the foot body 304. When the piston moves up toward the cover 307, the support member 340 extends further from the cover, extending the overall length of the foot assembly. When the piston moves down toward the base 308, more of the support member 340 is positioned inside the interior reservoir and hence the overall length of the foot assembly 301 is smaller.

Referring again to FIGS. 7-9, in the first figure, the foot assembly is shown in the top position. In this position the channel 317 is open in both directions. The foot assembly 1 can be compressed by pressure downwardly on the support member 340 of greater than the upward pressure of the piston spring 336. The wedge 326 is lodged in position in the piston 312 to allow a gap 328 about the ball valve 321 and allow free fluid flow through the channel 317.

In FIG. 2, the wedge 326 is dislodged from the depression in the piston 312 allowing the ball valve spring 322 to act on the ball valve 321 to close the channel 317. Thus fluid can move freely from the lower chamber 315 to the upper chamber 316 but not in the other direction. This allows for the foot assembly's overall length to be extended but not contracted. The foot assembly is held in equilibrium until the weight of the object is lifted from the foot assembly allowing the piston spring 336 to act on the piston 312 and move it within the interior reservoir 310.

In FIG. 3, the wedge is again dislodged. The shaft 334 is acting upon the ball valve 321 and through it upon the wedge 326 to dislodge the wedge 326 from the piston 312.

Figure 10:
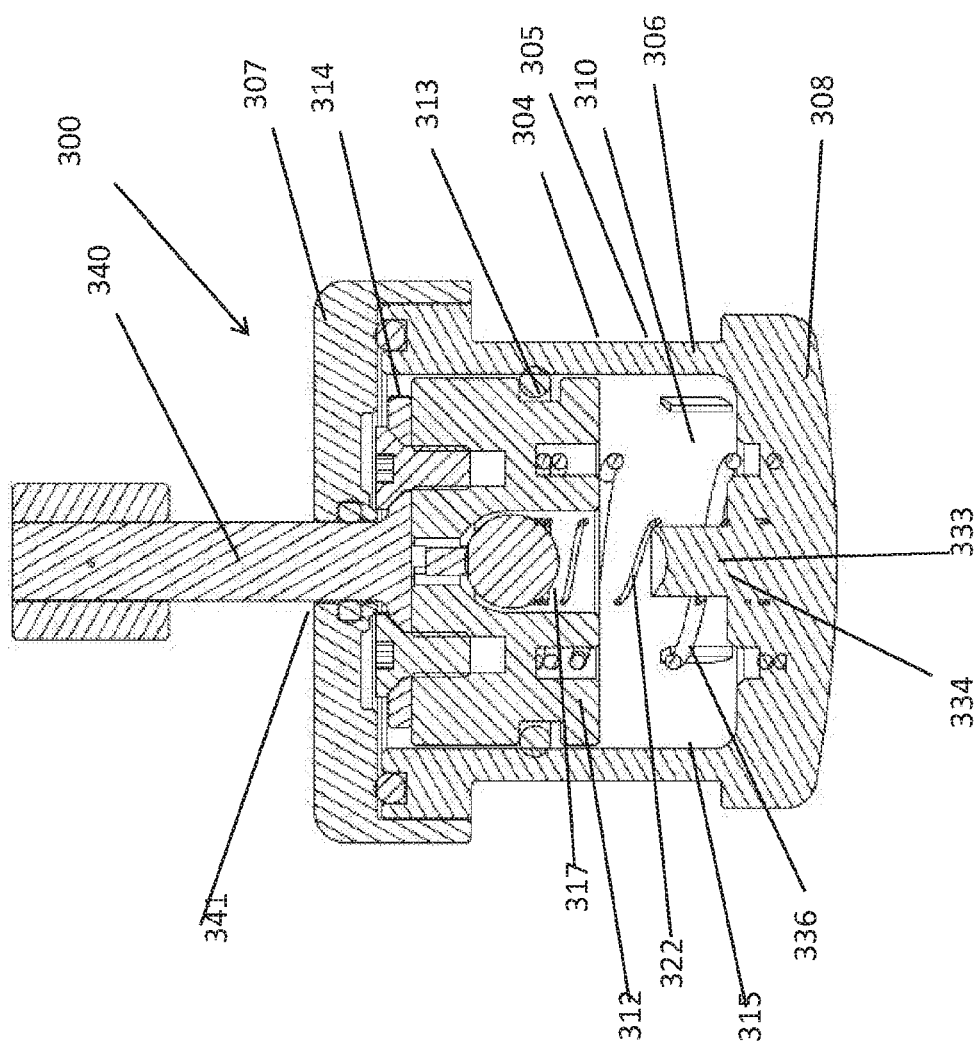
FIG. 10 is a side cross sectional view of the device of FIG. 7.

Referring now to FIG. 10, the foot assembly is shown from an alternative angle. In this figure, the engagement between the support member 340 and the piston 312 can be seen.

Figure 11:
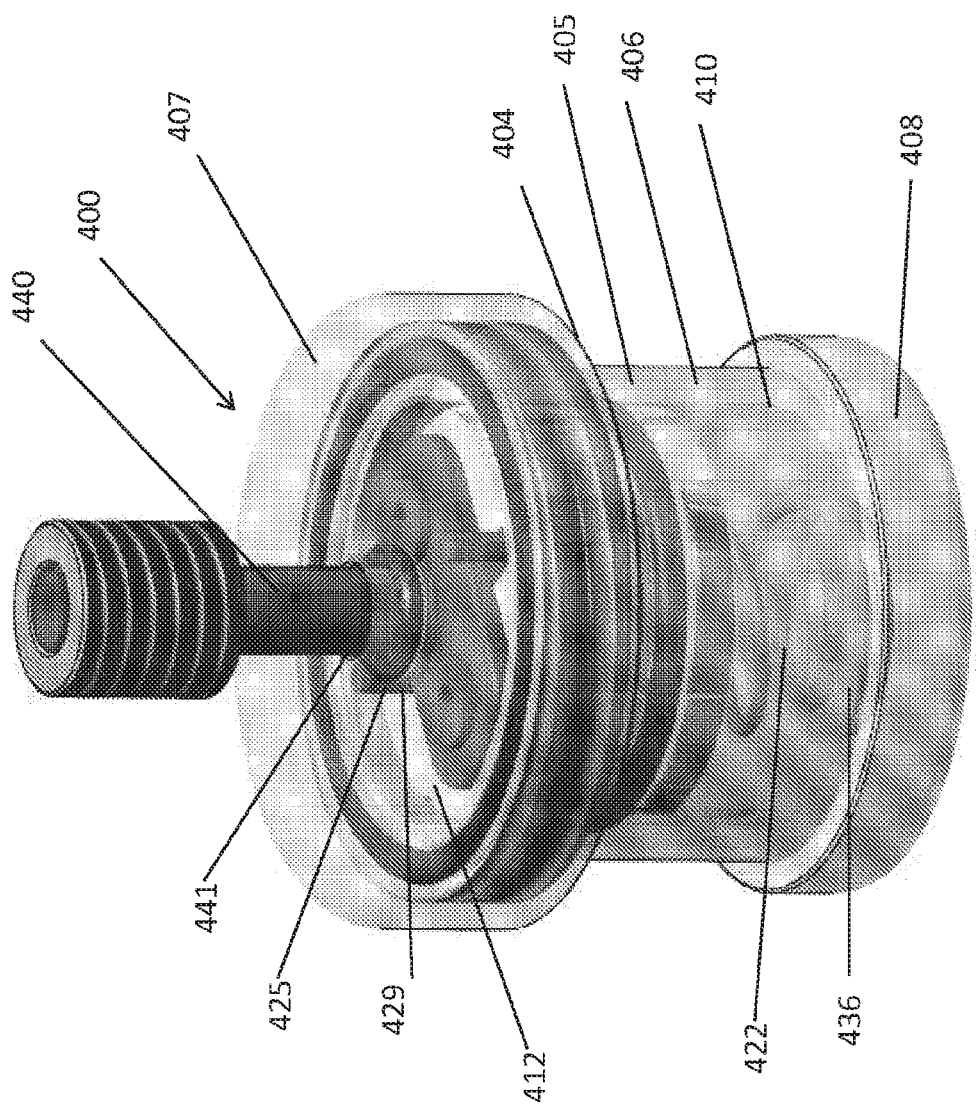
FIG. 11 is a perspective translucent view of a device of one embodiment of the disclosure.
Figure 12:
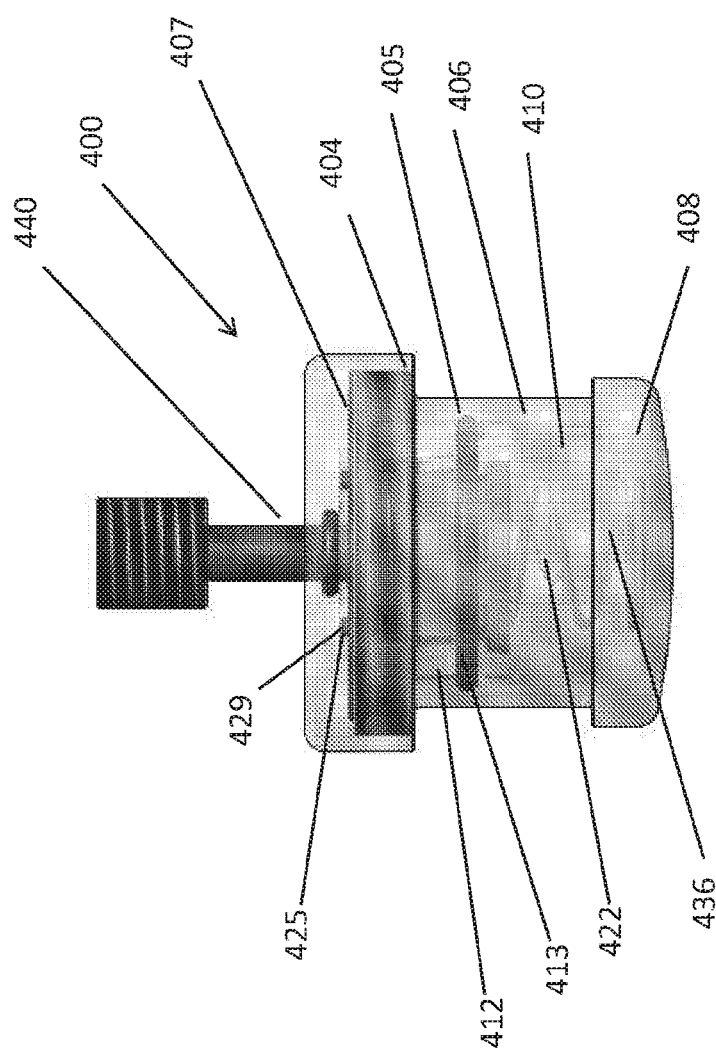
FIG. 12 is a side translucent view of a device of FIG. 11.

Referring now to FIGS. 11 and 12, shown is a foot assembly 400 for supporting an object above a surface. The foot assembly 400 comprises a foot body 404 in the form of a cylinder 405 defined by walls 406, a cover 407 at the object end and a base 408 at the surface end of the foot body 404. The foot body 404 defines an interior reservoir 410. The interior reservoir is configured to contain fluid such as hydraulic fluid or oil or alternative fluids.

A piston 412 is located within the interior reservoir 410 of the foot body 404 and moveable within the interior reservoir 410. A support member 440 in the form of a leg extending from the piston 412 and through an opening 441 in the cover 407 of the foot body 404, is engaged with the piston 412. Movement of the piston 412 within the interior reservoir 10 effects movement of the support member 440 in the form of a leg extending from the piston 412 and through an opening 441 in the cover 407 of the foot body 404. When the piston moves up toward the cover 407, the support member 440 extends further from the cover, extending the overall length of the foot assembly. When the piston moves down toward the base 8, more of the support member 440 is positioned inside the interior reservoir and hence the overall length of the foot assembly 400 is smaller.

The foot assembly 400 further includes a valve stop element 425 in the form of a wedge which interacts with the piston 412 and is moveable to block the movement of the ball valve (not illustrated) into the closed position.

Figure 13:
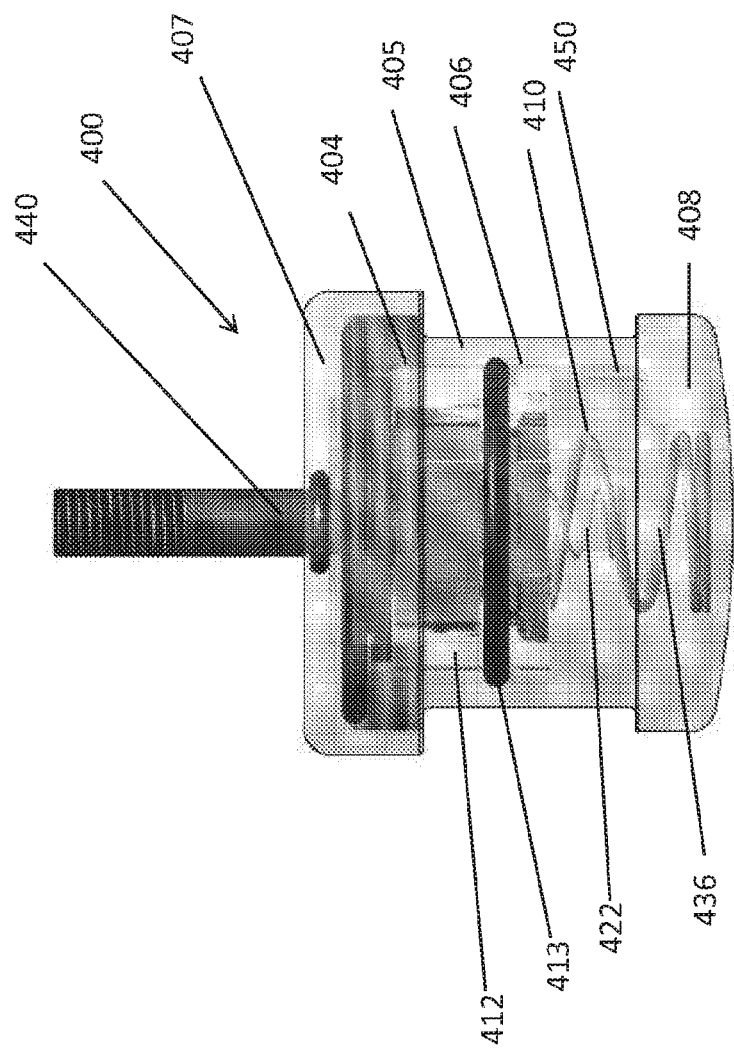
FIG. 13 is a side translucent view of a device of FIG. 11.

Referring now to FIG. 13, the foot assembly 1 includes anti-rotation splines 450 to resist rotation of the piston 412 within the interior reservoir 410 of the cylinder 405.

Figure 14:
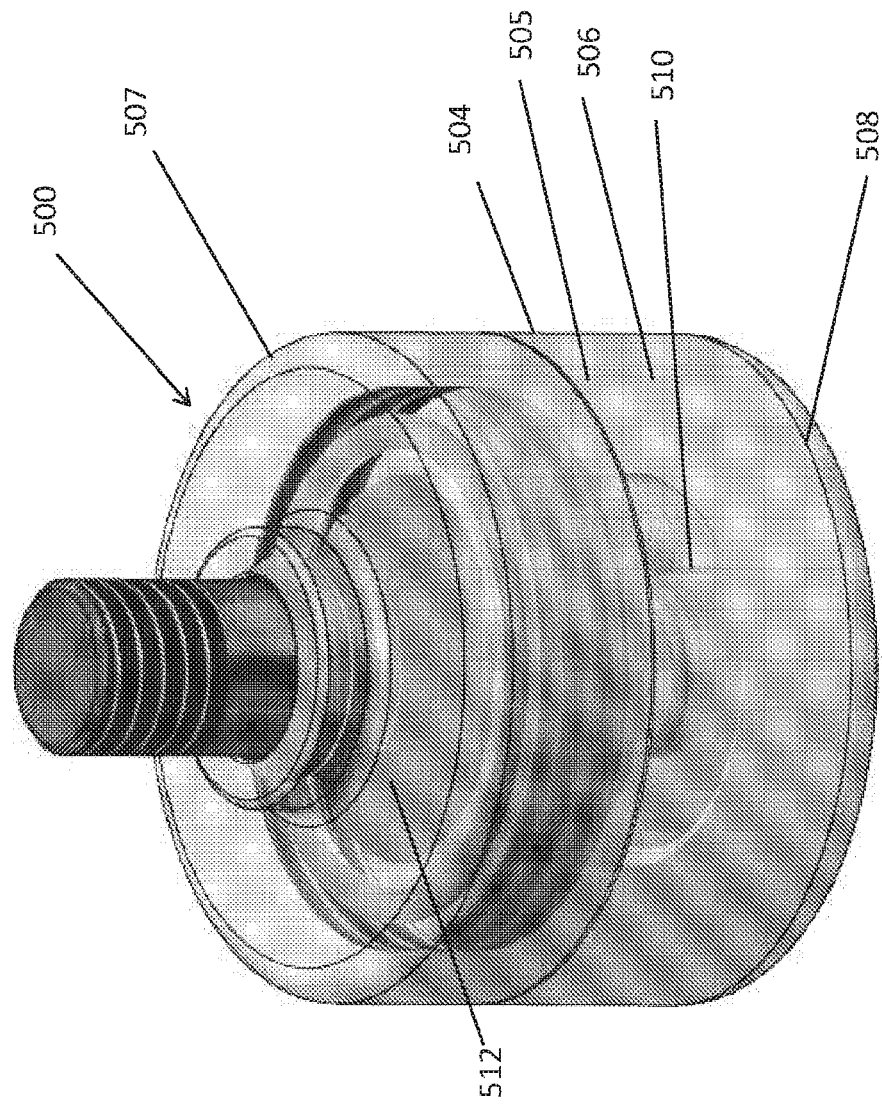
FIG. 14 is a perspective translucent view of a device of one embodiment of the disclosure.
Figure 15:
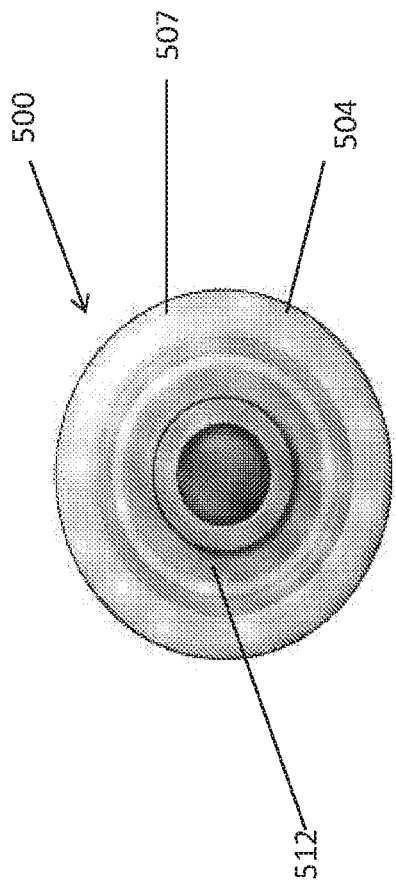
FIG. 15 is a top translucent view of a device of FIG. 14.
Figure 16:
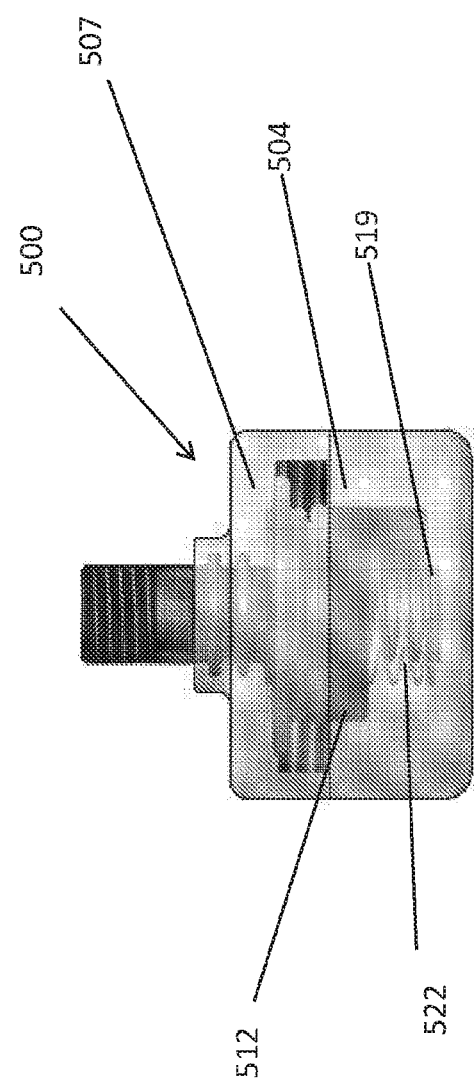
FIG. 16 is a side translucent view of a device of FIG. 14.
Figure 17:
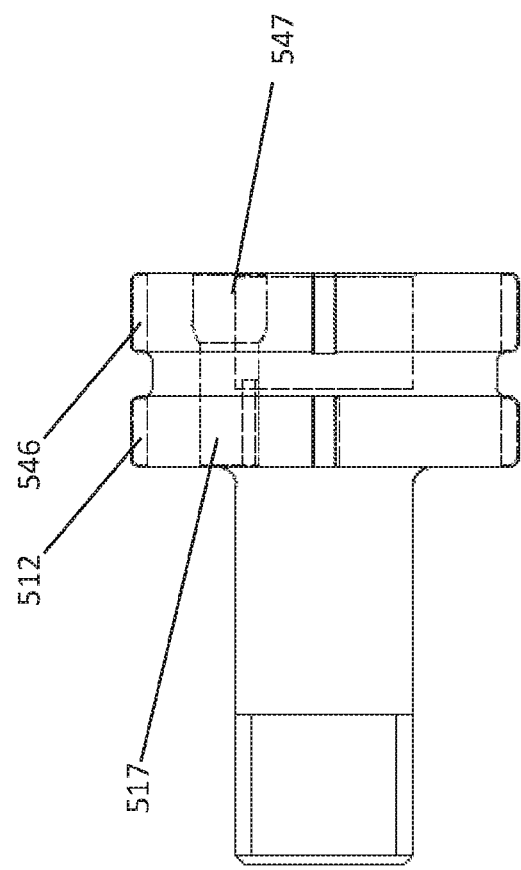
FIG. 17 is a cross sectional view of a piston of one embodiment of the disclosure.
Figure 21:
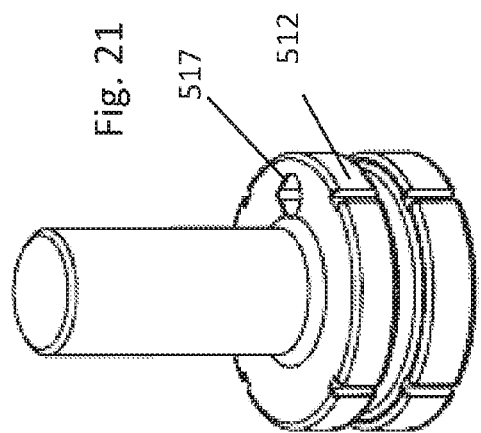
FIG. 21 is a perspective view of the piston of FIG. 17.
Figure 20:
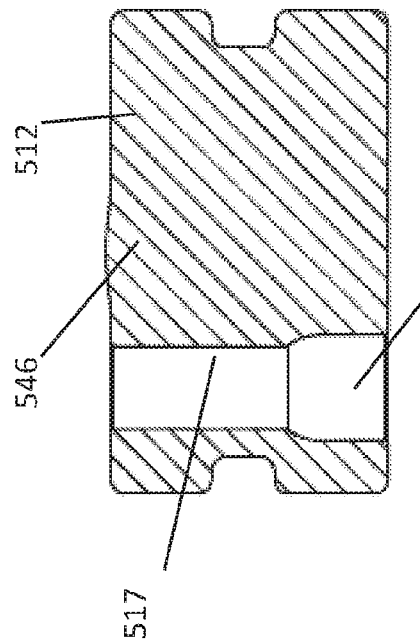
FIG. 20 is a cross sectional view of a portion of the piston of FIG. 17.

Referring now to FIGS. 14-16, an alternative embodiment of the foot assembly 500 is shown. The foot assembly 500 comprises a foot body 504 in the form of a cylinder 505 defined by walls 506, a cover 507 at the object end and a base 508 at the surface end of the foot body 504. The foot body 504 defines an interior reservoir 510. The interior reservoir is configured to contain fluid such as hydraulic fluid or oil or alternative fluids.

A piston 512 is located within the interior reservoir 510 and divides the interior reservoir 510 into an upper chamber located proximal the object end of the foot body 504 and a lower chamber located proximal the surface end of the foot body 504. An o-ring positioned at the edge of the piston 512 prevents fluid flow around the piston. The upper chamber and lower chamber are in fluid communication through a channel (not illustrated) extending through the piston 512.

Movement of the piston 512 within the interior reservoir 510 effects movement of fluid between the upper and lower chambers as it effects a change in the relative capacity of the upper chamber and the lower chamber. The fluid moves between the chambers through the channel.

The piston 512 is biased upwardly by a spring 519. A valve is located in the channel. The valve is in the form of a ball valve biased upwardly into the piston 512 by a ball valve spring 522. The ball valve is moveable into a closed position in which it restricts the flow of fluid between the chambers.

In this form, as best shown in FIGS. 17-21, the piston 512 comprises a cylindrical body 546 having a channel 517 extending therethrough. The channel 517 is offset with respect to the centre of the piston. The channel 517 includes a valve cavity 547 which forms part of the channel 517. In use, the ball valve is located in and moveable with respect to the valve cavity 547 to block the channel 517. A valve stop mechanism stops the ball valve from moving into the blocking position.

In use, the foot assembly can be easily retrofit to the object to allow effective extension of the legs of the object to stabilise the object.

In the claims which follow and in the preceding summary except where the context requires otherwise due to express language or necessary implication, the word "comprising" is used in the sense of "including", that is, the features as above may be associated with further features in various embodiments.

Variations and modifications may be made to the parts previously described without departing from the spirit or ambit of the disclosure.

The invention claimed is:

1. A foot assembly for supporting an object on a surface, the foot assembly comprising:
   a foot body defining an interior reservoir, the interior reservoir extending between a surface end and an object end;
   a piston moveable within the interior reservoir and dividing the interior reservoir into a first chamber and a second chamber, the chambers being in fluid communication with one another, movement of the piston effecting a change in interior capacity of the first chamber with respect to the second chamber;
   a valve arrangement for interrupting flow of fluid between the chambers;
   a support member extending from the piston through a wall of the foot body, the support member being configured such that movement of the piston within the interior reservoir effects movement of the support member with respect to the wall of the foot body to move the support member between an extended position and a contracted position, wherein in the extended position a greater length of support member extends beyond the foot body and in the contracted position a greater length of support member is positioned within the interior reservoir, the valve arrangement being adapted to allow movement of fluid between the chambers when fluid pressure in one chamber is greater than a predetermined level, while resisting movement of fluid between the chambers when fluid pressure in both chambers is below a predetermined level.

2. An assembly as defined in claim 1, wherein the valve arrangement restricts fluid movement in a first direction when the fluid pressure in the assembly is lower than a predetermined minimum in that direction and restricts movement in a second direction when the fluid pressure in the assembly is lower than a predetermined minimum in that direction.

3. An assembly as defined in claim 1, wherein the valve arrangement resists movement of fluid by moving into a rest configuration when the fluid pressure in both chambers is below a predetermined level.

4. An assembly as defined in claim 3, wherein in the rest configuration the valve arrangement is closed.

5. An assembly as defined in claim 1, wherein an external force is required to overcome the valve arrangement resisting movement of fluid.

6. An assembly as defined in claim 1, wherein the foot body comprises a cylinder and the support member extends from the piston through the wall of the cylinder, the support member being configured such that movement of the piston within the interior reservoir effects movement of the support member with respect to the wall of the cylinder, changing the overall length of the foot assembly.

* * * * *